United States Patent [19]

Hinton et al.

[11] Patent Number: 5,500,948
[45] Date of Patent: Mar. 19, 1996

[54] TRANSLATING INSTRUCTION POINTER VIRTUAL ADDRESSES TO PHYSICAL ADDRESSES FOR ACCESSING AN INSTRUCTION CACHE

[75] Inventors: Glenn J. Hinton, Portland; Robert M. Riches, Jr., Hillsboro, both of Oreg.

[73] Assignee: Intel Corporation, Santa Clara, Calif.

[21] Appl. No.: 274,214

[22] Filed: Jul. 13, 1994

Related U.S. Application Data

[63] Continuation of Ser. No. 784,568, Oct. 29, 1991, abandoned.

[51] Int. Cl.$^6$ ............................................. G06F 12/00
[52] U.S. Cl. ..................... 395/415; 395/467; 364/DIG. 1
[58] Field of Search ................................... 395/400, 425, 395/445, 413, 414, 415, 417

[56] References Cited

U.S. PATENT DOCUMENTS

| | | | |
|---|---|---|---|
| 4,682,281 | 7/1987 | Woffinden et al. | 395/400 |
| 4,774,653 | 9/1988 | James | 395/400 |
| 4,811,215 | 3/1989 | Smith | 395/400 |
| 4,884,197 | 11/1989 | Sachs et al. | 395/425 |
| 5,099,415 | 3/1992 | Osler et al. | 395/400 |
| 5,237,671 | 8/1993 | Freitas et al. | 395/425 |
| 5,412,787 | 5/1995 | Forsyth et al. | 395/425 |

OTHER PUBLICATIONS

Hayes, John P., Computer Architecture and Organization, McGraw–Hill Book Company, 1978, pp. 382–397.

Primary Examiner—Rebecca L. Rudolph
Attorney, Agent, or Firm—Owen L. Lamb

[57] ABSTRACT

A data processing system comprised of a memory, a translation lookaside buffer (TLB) providing access to the memory, and an instruction cache connected to the memory. A two entry translation write buffer (TWB) has a first entry that is a first logical register and an associated first physical address register and a second entry that is a second logical register and an associated second physical address register. A physical address bus is connected to the TWB and a logical address bus is connected to the TLB and to the TWB, the logical address bus presenting an instruction pointer to the TLB and to the TWB. The instruction pointer is comprised of logical address bits including upper order bits, lower order bits, and a single bit having a first value or a second value. The single bit provides for translation of even-number pages for which the single bit has the first value and for odd-number pages for which the single bit has the second value. The upper order bits of the logical address are compared with the stored address values in the first and second logical registers in the TWB resulting in a first hit signal with respect to the first logical register or a second hit signal with respect to the second logical register. The first logical register is selected if the single bit has the first value and the second logical register is selected if the single bit has the second value. The physical address bus is driven with the corresponding first or second physical address associated with a selected first or second logical register upon a condition that the upper order bits of the logical address equal a stored value in the first or second logical register in the TWB.

4 Claims, 6 Drawing Sheets

TRANSLATING INSTRUCTION POINTER VIRTUAL ADDRESSES TO PHYSICAL ADDRESSES FOR ACCESSING AN INSTRUCTION CACHE

This is a continuation of Ser. No. 784,568, filed Oct. 29, 1991, abandoned.

CROSS REFERENCES TO RELATED APPLICATIONS

This application is related by a common assignee to the following: US Statutory Invention Registration H1291 of Hinton et al published Feb. 1, 1994 for "Microprocessor in Which Multiple Instructions are Executed in one Clock Cycle by providing Separate Machine Bus Access to a Register File for Different Types of Instructions"; copending patent application "Instruction Fetch Unit in a Microprocessor That Executes Multiple Instructions in One Cycle and Switches Program Streams Every Cycle" Ser. No 07/630, 498, filed Dec. 20, 1990; and U.S. Pat. No. 5,423,014 granted Jun. 6, 1995, to Hinton et al. for "Instruction Fetch Unit With Early Instruction Fetch Mechanism", all assigned to Intel Corporation.

BACKGROUND OF THE INVENTION

1. Field of the Invention

The invention relates to data processing systems and more particularly to a method and apparatus for translating instruction pointers for accessing an on-chip instruction cache.

2. Description of the Related Art

In the above-referenced copending application Ser. No. 07/630,499, the instruction cache is physically addressed. Each Instruction Pointer (IP) is "translated" from the logical address to the corresponding "Physical" address by a translation lookaside buffer (TLB). The TLB is a cache of the most recent logical-to-physical-address mappings. Since the instruction cache is physically addressed, it does not need to be "flushed," or completely invalidated each time the processor does a "process switch" which changes the logical address space to a new program. A logically addressed cache must be invalidated on each process switch since the same logical address in one process points to different data than it does in another process. To ensure that each process gets its correct data, a logical cache needs to be flushed on each process switch. In a physically addressed cache the physical addresses used always point to the correct data regardless of which process is running. A physically addressed cache, therefore, does not need to be flushed on each process switch. A logically addressed cache can also have more than one logical address pointing to the same physical address (address aliases). This also causes difficulties for the hardware, or the software, or both. A physically addressed cache also removes the problems caused by these potential address aliases. It is an object of the present invention to provide an address translation mechanism that will translate a logical address from a program counter to a physical address to be used to check an on-chip cache for an instruction.

SUMMARY OF THE INVENTION

Briefly, the invention is embodied in a data processing system comprised of a memory, a translation lookaside buffer (TLB) providing access to the memory, and an instruction cache connected to the memory in which frequently used instructions are stored. A two entry translation write buffer (TWB) is provided. A first entry of the TWB being a first logical register and an associated first physical address register and a second entry of the TWB being a second logical register and an associated second physical address register. A physical address bus connected to the TWB and a logical address bus is connected to the TLB and to the TWB, the logical address bus presenting an instruction pointer to the TLB and to the TWB. The instruction pointer is comprised of logical address bits including upper order bits, lower order bits, and a single bit having a first value or a second value, the single bit providing for translation of even-number pages for which the single bit has the first value and for odd-number pages for which the single bit has the second value. The TWB includes a comparison logic that compares the upper order bits of the logical address with the stored address values in the first and second logical registers in the TWB resulting in a first hit signal with respect to the first logical register or a second hit signal with respect to the second logical register. A control logic connected to the selects the first logical register if the single bit has the first value and the second logical register if the single bit has the second value. A MUX connected to the TWB, to the control logic, and to the physical address bus, drives the physical address bus with the corresponding first or second physical address associated with a selected first or second logical register upon a condition that the upper order bits of the logical address equal a stored value in the first or second logical register in the TWB.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein.

DESCRIPTION OF THE PREFERRED EMBODIMENT

Figure 1:
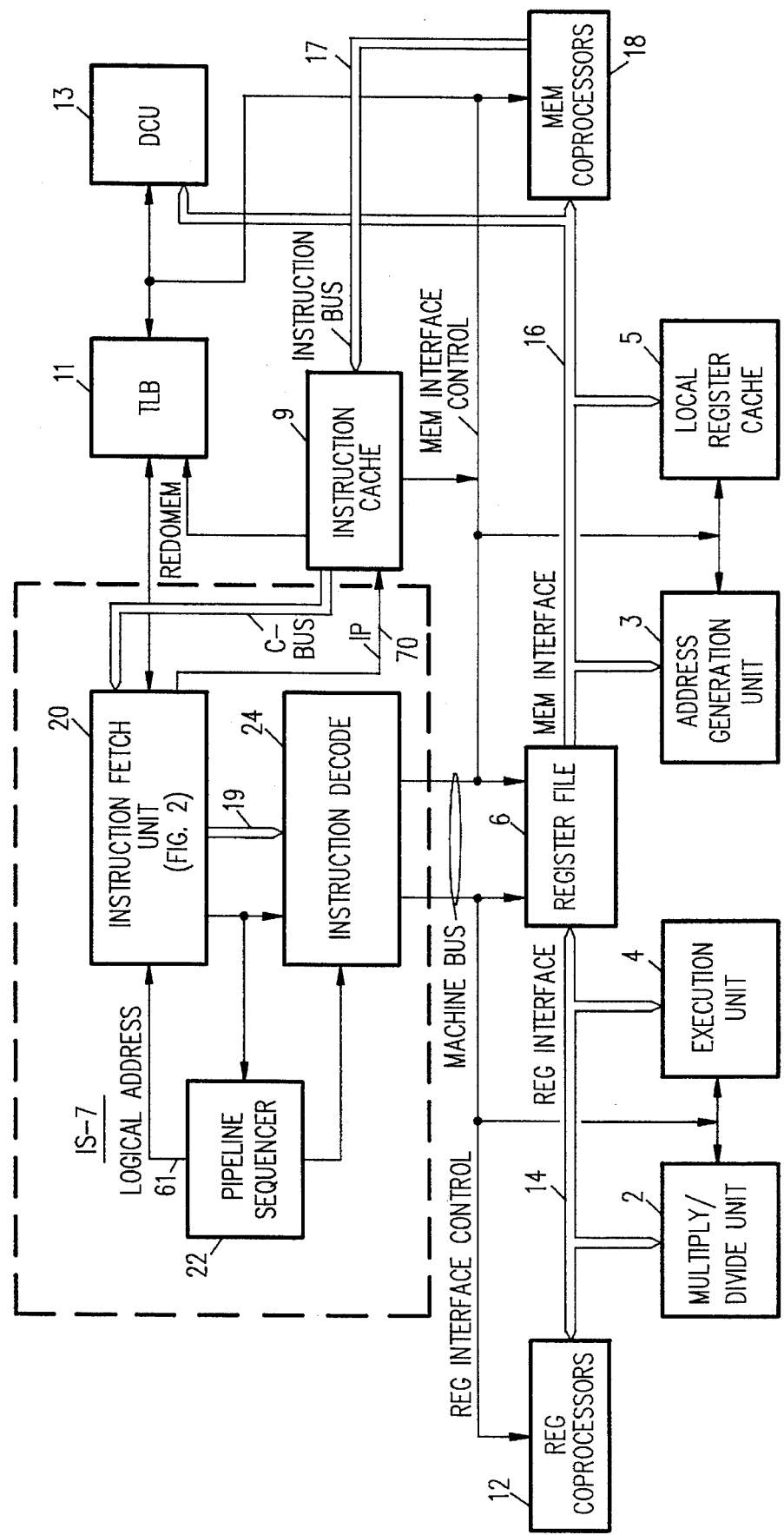
FIG. 1 is a block diagram of a microprocessor in which the present invention is embodied.

Refer to FIG. 1. An Instruction Cache and ROM, I-Cache, (9) provides an Instruction sequencer (7) with instructions every cycle. It contains a 2-way set-associative instruction cache and a microcode ROM. The ROM is an always-hit portion of the cache. The I-Cache is four words wide and is capable of supplying four words per clock to an Instruction Sequencer (IS). The I-Cache also contains the external fetch handling logic that is used when an instruction fetch misses the I-Cache.

The Instruction Sequencer, IS, (7) decodes the instruction stream (19) and drives the decoded instructions onto the machine bus. It includes the Fetch Unit (IFU-20), the Instruction Decoder (ID-24) and the Pipeline Sequencer (PS-22). The instruction sequencer (7) decodes the incoming four instruction words from the Cache (9). The instruction sequencer detects dependencies between the instructions and issues as many instructions as it can per clock.

The Register File, RF, (6) has 16 local and 16 global registers. The RF has 4 independent read ports and 2 independent write ports to support machine parallelism.

The Execution Unit, EU, (4) performs all the simple integer and ordinal operations of the microprocessor.

The Multiply-Divide Unit, MDU, (2) performs the integer/ordinal multiply, divide, remainder, and modulo operations.

The Address Generation and Execution Unit, AEGU, (3) is used to do the effective address calculations in parallel with the integer execution unit. It performs the load-effective-address instructions (LDA) and also does the address computations for loads and stores.

The Local Register Cache, LRC, (5) maintains a stack of multiple 16-word local register sets. On each call the 16 local registers are transferred from the RF to the LRC. This allocates the 16 local registers in the RF for the called procedure. On a return the 16 words are transferred back into the RF to the calling procedure.

The Translation Lookaside Buffer, TLB. (11) is used by the instruction fetch unit for mapping logical addresses to physical addresses.

The Data Cache Unit, DCU, (13) is a 2K byte physical write-through data cache with a line size of 16 bytes. It is connected to the RF by a 128 bit-wide bus so up to 16 bytes can be transferred in a single clock cycle.

The REG interface (14) is where all of the REG format instructions are executed. One instruction per clock can be issued on the REG interface. The operations can be single or multi-cycle as long as they are independently sequenced by the respective REG coprocessor (12). The coprocessors on this interface arbitrate among themselves if necessary to return their results.

The MEM interface (16) is where all MEM format instructions are executed. It also connects the system to the memory coprocessor (18). The on-chip memory coprocessor can be a bus controller (BCU) that connects to off-chip memory. One instruction per clock can be issued on this interface. The operations can be single or multi-cycle just as described above for the REG interface. The coprocessors on this interface arbitrate among themselves if needed to return their results.

The Instruction Fetch Unit or IFU (20) provides instructions to the Instruction Sequencer (IS) unit. The IFU fetches instructions from external memory, manages the contents of the instruction cache (9), translates logical addresses supplied by the Pipe Sequencer (PS) into physical addresses, and provides some preliminary instruction decoding and control functions to help the IS.

Figure 2:
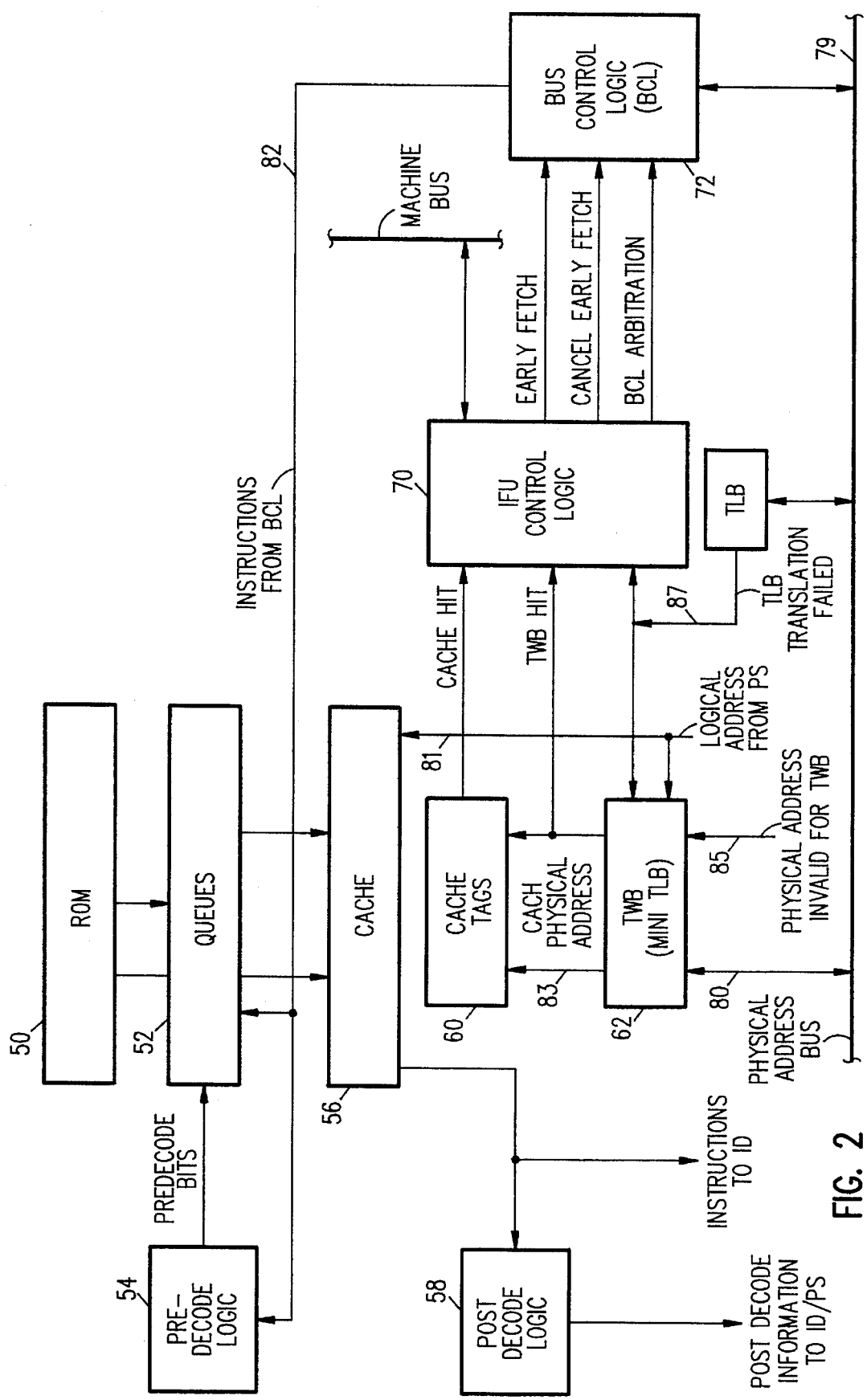
FIG. 2 is a block diagram of an instruction fetch unit shown in FIG. 1.

Refer to FIG. 2. In order to carry out its functions, the IFU contains a ROM (50) which contains the internal microcode used on the chip, an instruction cache (56) to hold instructions fetched from memory, instruction queues (52) for temporary instruction storage between memory and the cache, instruction pre-decode (54) and post-decode logic (58), address translation logic (62), cache tag logic (60), and the necessary IFU control logic (70) to make everything work together.

Each cycle, the PS gives the IFU some control information and the logical address of some instructions it wants the IFU to supply. If the instructions are in the ROM, the IFU supplies the instructions one phase later. If the instructions are to come from memory, the IFU translates the logical address into a physical address, then checks to see whether the instructions are already in the cache. If the instructions are in the cache, the IFU supplies them to the ID one phase after the address was presented by the PS. If the address translation fails or the instructions are not in the cache, the IFU fetches them from memory. As the instructions are being fetched from memory, the translation write buffer (62) is updated, and the cache tag array (60) is written. When the instructions (82) arrive from the Bus Control Logic, BCL, (72), they are put in the instruction queues (52), along with their pre-decode information. If the PS still wants these particular instructions, the IFU supplies them to the ID, along with the appropriate post-decode and control information.

Refer to FIG. 2 which is a block diagram of an instruction fetch unit in which the present invention is embodied. As described in copending application Ser. No. 07/784,569, the main function of the Instruction Fetch Unit (IFU) is to provide instructions to an instruction decoder (ID). It's auxiliary functions include fetching instructions from external memory, managing the contents of an instruction cache, translating logical addresses supplied by a Pipeline Sequencer (PS) into physical addresses, and providing some preliminary instruction decoding and control functions to help the ID.

In order to carry out its functions, the IFU contains a read only memory (ROM-50) which stores an internal microcode used by an execution unit, an instruction cache (56) to hold instructions fetched from memory, instruction queues (52) for temporary instruction storage between memory and the cache, instruction pre-decode (54) and post-decode logic (58), address translation logic (62), cache tags logic (60), and the necessary control logic (70) to make everything work together.

Each cycle, the PS gives the IFU some control information and a logical address (81) of some instructions it wants the IFU to supply. If the instructions are in the ROM (50), the IFU supplies the instructions one phase later. If the instructions are to come from memory, the IFU translates (62) the logical address into a physical address, then checks to see if the instructions are already in the cache (56). If the instructions are in the cache, the IFU supplies them to the ID one phase after the address (81) was presented by the PS. If the address translation fails or the instructions are not in the cache, the IFU fetches them from memory through bus control logic (72). As the instructions are being fetched from memory, the address translation buffer (62) is updated, and the cache tag array (60) is written. When the instructions (82) arrive from the Bus Control Logic (72), they are put in the instruction queues (52), along with their pre-decode information. If the PS still wants these particular instructions, the IFU supplies them to the instruction decoder/pipeline sequencer (ID/PS), along with the appropriate post-decode and control information (58). The functional blocks that make up the IFU are as follows:

Cache: The cache (56) contains instructions fetched from external memory.

Cache Tags: The tags block (60) holds the tags for each line of the cache. These tags are physical addresses rather than logical addresses. The physical address (83) from the TWB (62) is used by the tags block both for comparison of existing tags and for writing new tags into a tags random access memory (tags RAM).

Queue: The queues block (52) receives fetched instructions from the bus control logic (BCL) interface bus (82), generates the pre-decode bits, and holds these predecoded instructions until the cache is ready to receive them.

Post-decode: The post-decode block (58) contains logic that decodes the instructions from the cache and read only memory (ROM-50) to generate control signals needed by an instruction decoder (ID) and a pipe sequencer (PS) described in the above-identified application Ser. No. 07/630,499.

ROM: The ROM (50) contains the internal microcode that are supplied to an execution unit that is not shown in FIG. 1.

translation write buffer (TWB): The TWB or mini-TLB (62) is a 2-entry direct mapped Translation Lookaside Buffer (TLB) for use by the IFU. It is used for mapping logical addresses (81) to physical addresses (80) for purposes of comparing and writing the tags. Control: The IFU control logic (70) contains the control logic for the IFU and includes a control register. The fetch block (70) contains the random control logic for the IFU.

There are two portions of the data path of the IFU, the address path and the instruction path. The address path consists of the logical addresses (81) feeding the TWB, and the physical addresses (83) from the TWB feeding the Tags block. The instruction path consists of the ROM (50), the Queues (52), the Cache (56), and Post-decode (58). The center of the instruction path is the Cache bit lines. The ROM bit lines are organized as "true" and "bar" bit lines, much like the bit lines in a RAM array. At the bottom of the ROM is an interface cell which drives the values from the ROM bit lines directly onto the Cache bit lines. The Queues also drive the Cache bit lines.

When the execution unit wants instructions from the ROM, the cache row selects are disabled and the ROM bit lines drive onto the Cache bit lines through the interface cell described above. When it wants instructions that have been fetched from external memory into the queues, the Queues drive the Cache bit lines to get the instructions to the sense amps and out of the IFU, and the appropriate Cache row select is asserted to write these instructions from the Queues into the Cache. When the execution unit wants instructions from the Cache, the Cache drives onto the bit lines.

The Cache bit lines drive the sense amps, which drive MUXes to get the right instructions on the right output lines. The output of the MUXes is sent to the IS units and to the Post-decode block (58). The Post-decode block uses the instruction words to generate control signals for the IFU control logic, an Instruction Decoder, a Branch Look-Ahead unit, and a Pipe Sequencer.

Instruction Pointer (IP)

The IP that the processor computes is calculated just barely in time to begin the access to the on-chip Instruction cache. There is no time to go through a TLB before the access to the Instruction cache must begin. Because of the "split-line Instruction cache" described in copending patent application Ser. No. 06/630,498, the second IP needed is not even calculated when the Instruction cache access is begun. There is little time for this second address to be translated from its logical-to-physical address needed for the address tag compare in the Instruction cache. Also, because of the "early-fetch" mechanism described in U.S. Pat. No. 5,423,014, the complete physical address is needed very early to send to the physical address bus (80) bus.

Mini-TLB (TWB)

A small 3-entry instruction mini TLB (62) named a translation write buffer (TWB) is provided. Two of the three entries are used for normal instruction-fetch logical-to-physical address translations. These two entries are accessed in a "direct-mapped" manner. This uses bit 12 from the IP to select which of the two entries to use for a particular IP translation. This is effectively a 2-1 multiplexor that can operate in a very short period of time to meet the speed requirements mentioned above for the early-fetch and split-line Instruction cache mechanisms. Because of good instruction "locality," this two entry TWB gets a good hit rate.

The other entry is used to translate "microcode" IPs. Some of the microcode that the execution unit needs is stored in off-chip memory. It is desirable that this external microcode be placed anywhere that the system builder would like. This is allowed by translating the logical microcode IP to the physical address where the external microcode is placed. The single microcode entry in the TWB is used to accomplish this purpose. This microcode entry is only changed under explicit software control. It can never have a "miss". It is really a base address for the location of the external microcode block.

The two normal (nonmicrocode) entries may not have the required translation-mapping information to do the logical-to-physical translation of the current IP. This situation is called a TWB miss. When this miss occurs, the instruction fetch is canceled (both the early fetch to the bus control logic (72) and the instruction fetch to the on-chip Instruction cache). This instruction fetch is then reissued with the logical IP to the main TLB. This main TLB caches the address translation mappings for all instruction and data (load and store) accesses. If this instruction fetch access is translated correctly by the main TLB, the small TWB detects this and latches in the correct physical address needed to update the appropriate TWB entry (the correct one of the two as determined by bit 12 of the logical address). The main TLB and the TWB share a physical address bus (79) connected to the external bus controller. As the main TLB sends the instruction fetch to the main memory the TWB notices this and latches in the correct physical address. It then uses this to update the corresponding one of its two entries for future translations of instruction addresses.

Figure 3:
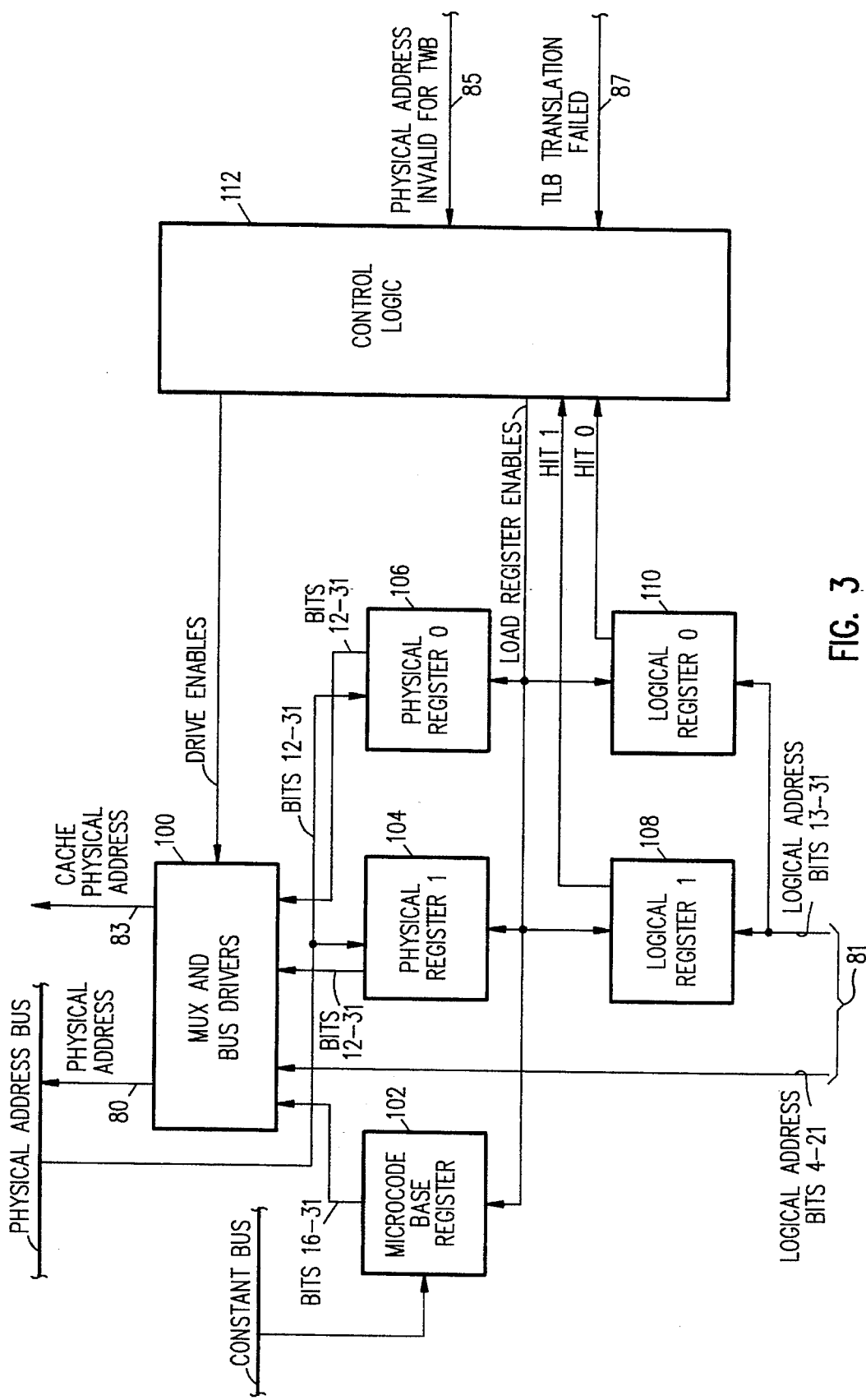
FIG. 3 is a block diagram of the translation write buffer (TWB) shown in FIG. 2.

FIG. 3 is a block diagram of the translation write buffer (TWB). A logical address (81) is separated into three parts. Bits 0 through 11 are an offset within an instruction page, and are passed through to the physical address unmodified. Bit 12 selects which of the two entries in the TWB (62) are to be used for this address. Bits 13 through 31 are compared against the stored logical address in the TWB. If these bits mismatch, it is considered a TWB miss, and the physical address from the TWB is considered invalid. If the bits match, it is considered a TWB hit, and the physical address bits 12 through 31 stored in the TWB are driven out to the cache on output cache physical address (83) and/or on output physical address (80) to the physical address bus. The logical registers (108, 110) compare the logical address (81) presented to the IFU with stored values. The hit 1 line indicates to the control logic (112) that a match occurred in logical register 1 (108). The hit 0 line indicates to the control logic (112) that a match occurred in logical register 0 (110). The physical registers (104, 106) provide stored-physical addresses to the MUX (100). Registers (106) marked "0" are for even-numbered 4KB pages, addresses for which bit 12 is a zero. Registers ((104) marked "1" are for odd-numbered 4KB pages, addresses for which bit 12 is a one. The microcode base register holds the microcode base address. The MUX (100) selects one of the three physical address registers and drives the physical address buses. The control logic block (112) coordinates the actions of the other blocks.

Figure 4:
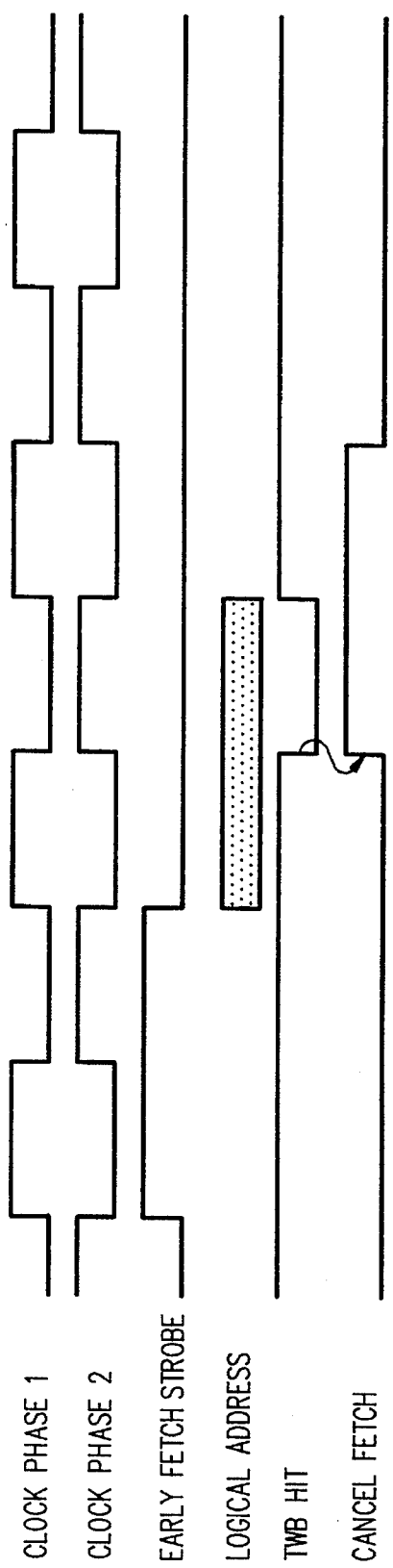
FIG. 4 is a timing diagram of a TWB miss.

FIG. 4 is the timing diagram for a TWB miss. The early fetch has been asserted by the IFU control logic. The following cycle, the logical address is presented to the TWB. The next phase, the logical registers compare bits 13 to 31 of this logical address with their stored values to determine a hit. The control logic selects one of these register's hit signals, depending on the value of address bit 12. If there was a miss, the IFU cancels the early fetch.

Figure 5:
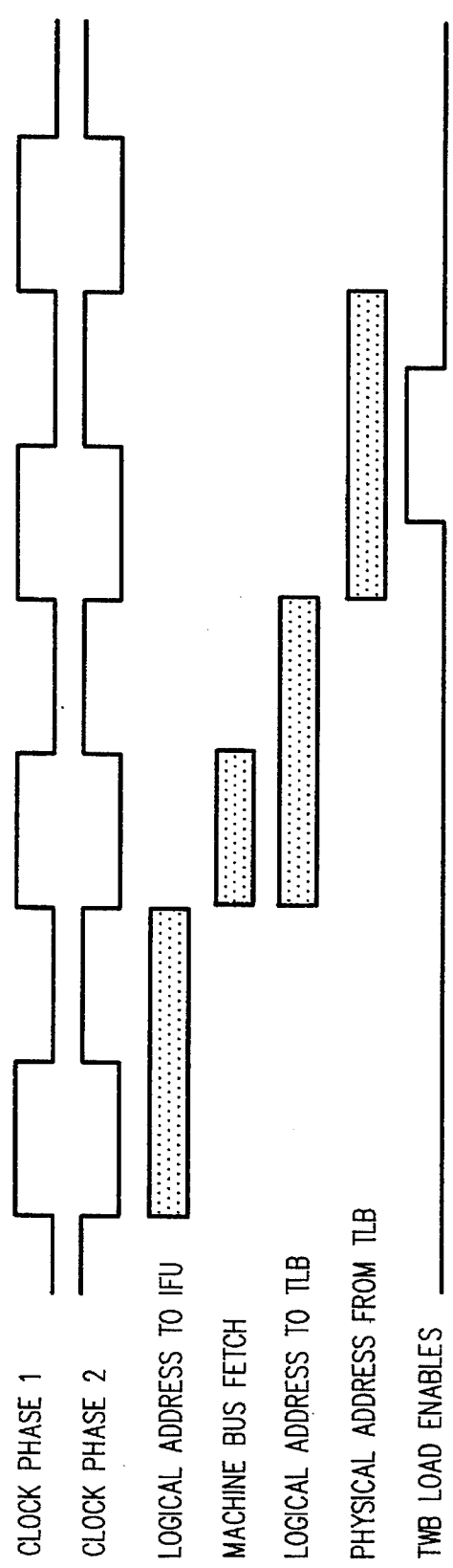
FIG. 5 is a timing diagram of TWB load.

FIG. 5 is the timing diagram for a TWB load. The logical address is presented to the IFU. The following cycle the IFU has determined that the TWB missed, so it issues a machine bus fetch. At this time, a logical address supplied by an address generation unit (AGU) arrives at the TWB. The following cycle the TLB drives the physical address bus, which the IFU/TWB monitors. Provided the TLB address translation was successful and can be used by the TWB, one set (even or odd) of the TWB registers is loaded with the logical and physical addresses.

Figure 6:
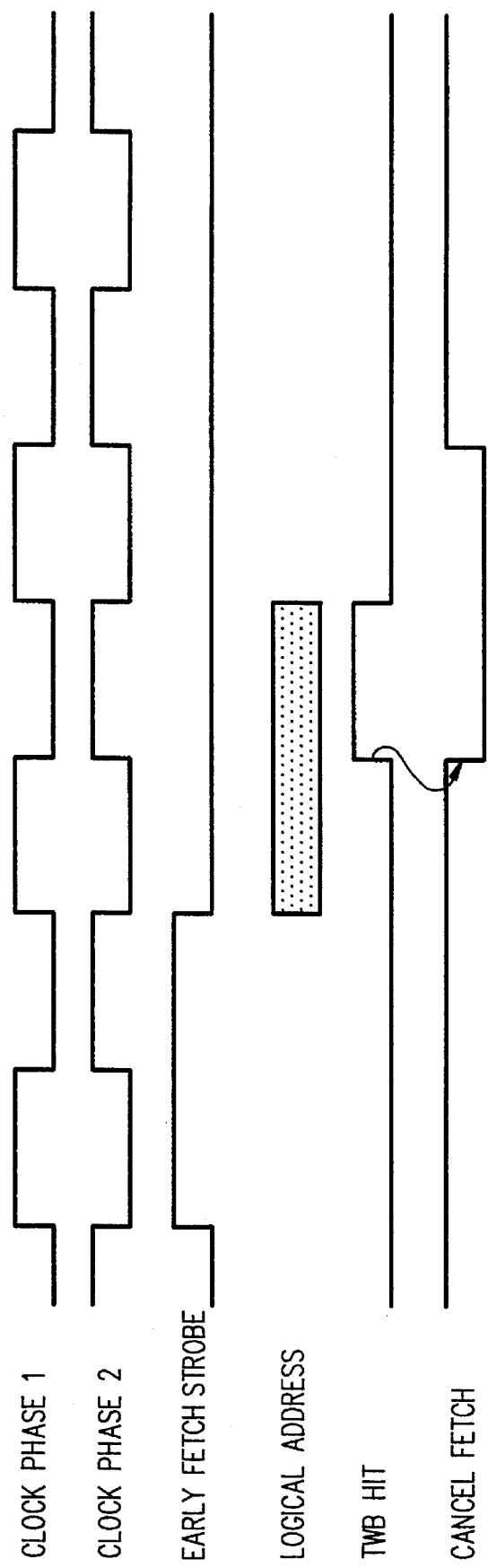
FIG. 6 is a timing diagram of TWB hit.

FIG. 6 is the timing diagram for a TWB hit. The early fetch has been asserted by the IFU control logic. The following cycle, the logical address is presented to the TWB. The next phase, the logical registers compare bits 13 to 31 of this logical address with their stored values to determine a hit. The control logic selects one of these register's hit signals, depending on the value of address bit 12. If there is a hit, and the instructions are not in the cache, the IFU does not cancel the early fetch.

Flow Chart

Figure 7:
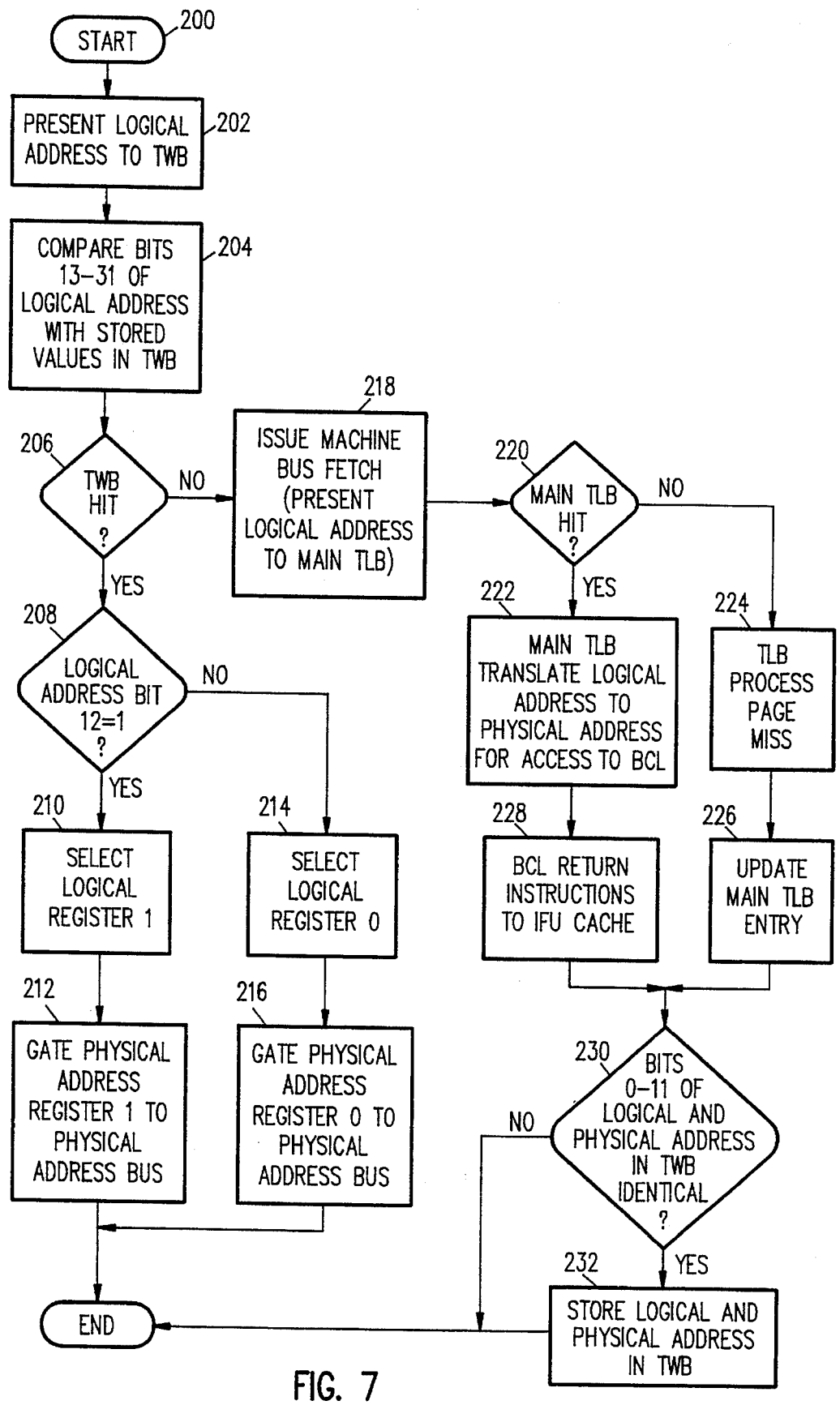
FIG. 7 is a flow chart of the operation of the TWB.

FIG. 7 is a flow chart of the operation of the TWB. A logical address is presented (201) to the TLB and to the TWB (202). The next phase, the logical registers in the TWB compare bits 13 to 31 of this logical address with their stored values (204). If they compare, it is a TWB hit (206). The control logic selects one of these register's hit signals, depending on the value of logical address bit 12 (208).

If there was a TWB miss (206), the IFU issues a machine bus fetch (218). The IFU drives the machine bus with an opcode that signifies an instruction fetch. The address generation unit sends the logical address to the TLB. If there is a TLB hit (220), the TLB translates (222) the logical address to a physical address and passes the access to the BCL, that is, the TLB drives the physical address bus, which the TWB monitors. The BCL gets the instructions from the bus and returns them to the IFU (228), which puts them in the cache.

If the TLB was able to translate the logical address to a physical address, which is a TLB hit (220), and it is a translation the TWB can handle, meaning bits 0 to 11 of the logical and physical addresses are identical (230), then the TWB stores away the logical and physical address in one of its entries (232). This is the mechanism by which the TWB is loaded.

While the invention has been particularly shown and described with reference to preferred embodiments thereof, it will be understood by those skilled in the art that the foregoing and other changes in form and detail may be made therein without departing from the scope of the invention.

We claim:

1. In a data processing system comprised of a memory, an instruction cache for storing frequently used instructions, said instruction cache being connected to said memory, a translation lookaside buffer (TLB) providing access to said memory, and a two entry translation write buffer (TWB) providing fast access to said cache, a method comprising steps of:

A. storing a first entry in said TWB, said first entry being stored in a first logical register and an associated first physical address register;

B. storing a second entry in said TWB, said second entry being stored in a second logical register and an associated second physical address register, each of said registers having stored values therein;

C. presenting an instruction pointer to said TWB, said instruction pointer comprised of logical address bits including upper order bits, lower order bits, and a single bit having a first value or a second value, said single bit providing for translation of even-number page addresses for which said single bit has said first value and for odd-number page addresses for which said single bit has said second value;

D. comparing said upper order bits of said logical address with said stored values in said first and second logical registers in said TWB resulting in a first hit signal with respect to said first logical register or a second hit signal with respect to said second logical register;

E. selecting upon a first condition that said upper order bits of said logical address equal a stored value in said first or second logical register in said TWB, said first hit signal if said single bit has said first value and said second hit signal if said single bit has said second value, resulting in a selected hit signal; and, F. gating to a physical address bus a stored value in one of said first or second physical address registers associated with said selected hit signal.

2. The method in accordance with claim 1, further comprising the steps of:

F. issuing a machine bus fetch, upon a second condition that said upper order bits of said logical address do not equal a stored value in said first or second logical register in said TWB;

G. sending said logical address to said TLB;

H. translating said logical address to a second physical address upon a third condition that said logical address is equal to a stored value in said TLB;

I. driving said physical address bus with said second physical address;

J. monitoring said physical address bus in said TWB;

K. returning instructions from a memory to said instruction cache;

L. comparing said lower order bits of said logical address and said second physical address; and, M. storing in said TWB said logical address and said second physical address upon a condition that said lower order bits are identical.

3. In a data processing system comprised of a memory, a translation lookaside buffer (TLB) providing access to said memory, an instruction cache in which frequently used instructions are stored, said instruction cache being connected to said memory, an improvement comprising:

a two entry translation write buffer (TWB) that provides fast access to said cache;

a first entry of said TWB being a first logical register and an associated first physical address register;

said first logical register having stored first address values therein;

a second entry of said TWB being a second logical register and an associated second physical address register;

said second logical register having stored second address values therein;

logical address bus means connected to said TLB and to said TWB for presenting an instruction pointer to the said TLB and to said TWB;

said instruction pointer comprised of logical address bits including upper order bits, lower order bits, and a single bit having a first value or a second value, said single bit providing for translation of even-number page addresses for which said single bit has said first value and for odd-number page addresses for which said single bit has said second value;

said TWB including comparing means for comparing said upper order bits of said logical address with said stored address values in said first and second logical registers in said TWB resulting in a first hit signal with respect to said first logical register or a second hit signal with respect to said second logical register;

control logic means connected to said TWB for selecting upon a condition that said upper order bits of said logical address equal a stored value in said first or second logical register in said TWB, said first hit signal if said single bit has said first value and said second hit signal if said single bit has said second value, resulting in a selected hit signal; and, a MUX connected to said TWB, to said control logic, and to said physical address bus, that drives said physical address bus with the corresponding first or second physical address associated with a selected first or second logical register upon a condition that said upper order bits of said logical address equal a stored value in said first or second logical register in said TWB.

4. In a data processing system comprised of a memory, a translation lookaside buffer (TLB) providing access to said memory, an instruction cache in which frequently used instructions are stored, said instruction cache being connected to said memory, an improvement comprising:

a two entry translation write buffer (TWB);

a physical address bus connected to said TWB;

a first entry of said TWB being a first logical register and an associated first physical address register;

said first logical register having stored first address values therein;

a second entry of said TWB being a second logical register and an associated second physical address register;

said second logical register having stored second address values therein;

a logical address bus connected to said TLB and to said TWB, said logical address bus presenting an instruction pointer to the said TLB and to said TWB, said instruction pointer comprised of logical address bits including upper order bits, lower order bits, and a single bit having a first value or a second value, said single bit providing for translation of even-number pages for which said single bit has said first value and for odd-number pages for which said single bit has said second value;

said TWB including a comparison logic that compares said upper order bits of said logical address with said stored address values in said first and second logical registers in said TWB resulting in a first hit signal with respect to said first logical register or a second hit signal with respect to said second logical register;

a control logic connected to said TWB, said control logic selecting said first logical register if said single bit has said first value and said second logical register if said single bit has said second value; and, a MUX connected to said TWB, to said control logic, and to said physical address bus, that drives said physical address bus with the corresponding first or second physical address associated with a selected first or second logical register upon a condition that said upper order bits of said logical address equal a stored value in said first or second logical register in said TWB.

* * * * *